United States Patent Office 2,863,839
Patented Dec. 9, 1958

2,863,839

CLAY CATALYSTS

George Alexander Mills, Swarthmore, Pa., assignor to Houdry Process Corporation, Wilmington, Del., a corporation of Delaware No Drawing. Application June 15, 1955
Serial No. 515,762

7 Claims. (Cl. 252—450)

The present invention relates to the preparation of improved hydrocarbon conversion catalysts from magnesia-containing clays and is particularly concerned with methods for treating such clays to improve their catalytic cracking properties from the standpoint of their ability to produce gasoline of enhanced anti-knock quality in the cracking of the usual gas oil or other hydrocarbon charge stock.

In prior U. S. Patent No. 2,547,036 there is described a process involving heating certain magnesia-containing clays, particularly acid-activated sub-bentonite clays of the montmorillonite family, at temperatures above about 1425° F. to deactivate the magnesia in the clay, and thus obtaining catalyst capable of producing gasoline of enhanced octane rating. While temperatures of about 1430° F. are shown in the patent examples to be effective for the purpose, the desired full extent of improvement in the catalyst properties from the standpoint of the quality of cracked gasoline produced by the use thereof, is evidenced at higher catalyst calcination temperatures in the 1500–1600° F. range.

The surprising discovery has now been made that the desired improvement in the properties of these magnesia-containing clays can be obtained at lower calcination temperatures if such calcination is carried out in the presence of $SO_2$. Such lower treating temperatures are necessarily advantageous from the standpoint of the benefits inherent operationwise in lower temperature requirements and equipment specifications. In addition, the ability to operate at these lower treatment temperatures is particularly desirable from the standpoint of avoiding the stringent requirements of close and careful temperature control otherwise necessary at higher temperatures, as in the 1500–1600° F. range, to avoid thermal damage to the clay, at which higher temperatures also there may be possible impairment of the steam stability of the catalyst.

In accordance with the present invention, therefore, active clay cracking catalysts containing magnesia are heated at a temperature above 1300° F. in a gas mixture comprising at least 1% $SO_2$ and some oxygen. The preferred gas mixtures contain about 5 to 30 mol. percent $SO_2$ and about 10 to 20% $O_2$. The use of gas mixtures with higher $SO_2$ content has shown no significant added advantage. The oxygen content of the gas stream should be substantially equivalent (in mols) to that of the $SO_2$, since substantial excess of either has no apparent added useful effect. Thus a mixture of 5 to 30% $SO_2$ in air has been found particularly effective for the purpose. There is no need for using treating temperatures above about 1500° F., although no harmful results are to be expected therefrom short of the sintering temperature of the clay.

While the treatment above described finds its principal application in the treatment of active clay catalysts of the acid-activated montmorillonite type of low iron content, as those obtained by sulfidation and acid leaching in accordance with U. S. Patent No. 2,466,048, it is not limited thereto. Because of the lower treating temperature that can be employed in the $SO_2$ treatment, even clays containing moderate amounts of fluxing impurities and as much as 1.0 to 1.5% $Fe_2O_3$ may be subjected to the herein described treatment without untoward effects.

The best clay catalysts are obtained by treatment for at least about an hour with $SO_2$ and air of those modified montmorillonite clay catalysts whose iron content has been reduced to less than 0.4% $Fe_2O_3$. These catalysts when so treated retain their characteristic high stability to sulfur stocks, have good steam stability and produce under conventional catalytic cracking conditions at relatively low coke levels high yields of gasoline having an octane quality equal to that obtained with the more expensive synthetic silica-alumina gel catalysts. Thus, a pelleted commercial acid activated montmorillonite clay catalyst modified by high temperature sulfidation and acid leaching followed by air calcination at about 1400° F., produced in cracking of a heavy East Texas gas oil, gasoline having an average $F_1$ clear octane rating of about 89.5. A catalyst similarly prepared but calcined in air containing $SO_2$ produced in cracking of a like charge stock under identical conditions gasoline having an average clear octane rating of 91.3.

The $SO_2$ treatment is generally applied to the catalyst material in the final shape or form in which it is to be charged to the hydrocarbon conversion unit. Thus for the conventional catalytic cracking systems of the fixed or moving bed type the catalyst will be in the form of pellets, and for the fluidized catalyst operations the catalyst will be in the form of a fine powder. While the catalyst may be subjected to $SO_2$ treatment in powder form as such, it is preferable to subject the clay to this treatment in the form of larger granular aggregates or pellets and then grind the treated material to desired powder size range.

EXAMPLE I

A raw montmorillonite clay identified as Kinney Ash Meadows (Nevada) was activated by acid treatment. The raw clay had the following typical analysis on a dry (105° C.) basis:

| | Weight percent |
|---|---|
| Ign. loss (1600° F.) | 7.79 |
| Si as $SiO_2$ | 57.7 |
| Al as $Al_2O_3$ | 22.0 |
| Fe as $Fe_2O_3$ | 2.26 |
| Ca as CaO | 1.79 |
| Mg as MgO | 4.98 |
| Alk as $Ak_2O$ | 3.42 |

Acid treatment of the raw clay was carried out at 200° F. for 1.5 hours using 20% aqueous sulfuric acid at an $H_2SO_4$/clay weight ratio of 0.8, followed by water washing.

The acid treated clay was made up into a paste of extrudable consistency and extruded to provide cylindrical 4 mm. pellets which were dried.

The dried pellets were then sulfided at about 1375° F. for two hours in 25% $H_2S$—75% $N_2$ followed by leaching at room temperature in 15% aqueous HCl solution for 4 hours and for an additional 20 hours in fresh acid of the same composition and water washing. These final pellets when dried contained 0.18% $Fe_2O_3$.

The dried pellets were then calcined at 1450° F. for six hours in a mixture of 25% $SO_2$—75% air.

The catalyst thus prepared was then tested in cracking of a heavy gas oil after an initial stabilizing steam treatment for 4 hours at 1300° F., with the following results:

*Charge: 56-77 East Texas gas oil; Oper. cond.: 900° F., 10 p. s. i. g., 10% steam*

Yields:
- Conversion, vol. percent charge _____ 55.0
- Gasoline (C₅+), vol. percent charge _____ 40.5
- C₄ cut, vol. percent charge _____ 13.6
- Coke, wt. percent charge _____ 4.0
- Dry gas, wt. percent charge _____ 7.2
- Octane rating C₅+ gasoline (F₁ clear) _____ 91.3

The gasoline yield and octane rating shown above are substantially equal to that obtained in cracking the same charge stock at the same conversion and coke levels over synthetic silica-alumina bead catalyst. Typical commercial acid-activated clay catalyst produced in cracking the same charge stock at the same temperature, gasoline of 89.8 octane rating and only 35.4% yield (by volume of charge) at this same coke level.

Obviously many modifications and variations of the invention as hereinbefore set forth may be made without departing from the spirit and scope thereof, and therefore only such limitations should be imposed as are indicated in the appended claims.

What is claimed is:

1. The method of improving active magnesia-containing clay catalysts which comprises treating the same in substantially dry form for at least about one hour with a gas mixture comprising oxygen and at least 1 mol percent $SO_2$ at a temperature above 1300° F. but below the sintering temperature of the clay.

2. The method according to claim 1 wherein said gas mixture comprises $SO_2$ and air.

3. The method according to claim 1 wherein said gas mixture comprises 5 to 30 mol percent $SO_2$.

4. The method of enhancing the quality of acid-activated montmorillonite clay catalysts which comprises treating the same in substantially dry form with a gas mixture comprising oxygen and at least 1 mol percent $SO_2$ at a temperature in the range of 1300 to 1500° F. for at least one hour.

5. The method according to claim 4 wherein said gas mixture comprises 5 to 30 vol. percent $SO_2$, and air.

6. The method according to claim 4 wherein said treatment is applied to such clay catalyst containing less than 0.4% $Fe_2O_3$.

7. The method according to claim 6 wherein such clay catalyst is one obtained by previous sulfidation and acid-leaching of a clay of higher iron content.

References Cited in the file of this patent

UNITED STATES PATENTS

| | | |
|---|---|---|
| 1,598,256 | Prutzman et al. | Aug. 31, 1926 |
| 1,649,366 | Potter | Nov. 15, 1927 |
| 1,828,380 | Rotger et al. | Oct. 20, 1931 |
| 2,174,610 | Weir | Oct. 3, 1939 |
| 2,466,048 | Shabaker et al. | Apr. 5, 1949 |
| 2,574,895 | Stecker | Nov. 13, 1951 |